Oct. 31, 1950     E. B. FITCH     2,528,047
RECOVERY OF GLUTAMIC COMPOUNDS FROM GLUTAMINE
CONTAINED IN AN IMPURE SOLUTION THEREOF
Filed Dec. 9, 1947     8 Sheets-Sheet 1

Fig. 1.

Starting Solution
Impure Glutamine-containing Solution of Amino Compounds

↓

Loading — Step I
Amino-Compounds and Impurity Cations onto
Cation Exchange Bed (Column 1.)

↓

Unloading — Step II
the Amino Compounds from the Cation Exchange Bed (Column 1.)

↓

Hydrolyzing — Step III
the Glutamine in the Unloaded Solution to yield P.C.*

↓

Purifying — Step IV
the Hydrolyzed Solution by passing through a
Cation Exchange Bed (Column 2.)
Yielding P.C.* and G.A.** as Acids free of Cations & of $NH_3$

↓

Separating — Step V
a P.C.* & G.A.** Fraction from a Neutral Amino Acids
& Betaine-Fraction
by passing through an Anion Exchange Bed (Column 3.)

↓

Removing — Step VI
P.C.* & G.A.** with $NH_4OH$ from Anion-Exchange Bed
(Column 3.) as Ammonium Salts.

↓

Converting — Step VII
P.C.* Salt to Mono-Sodium Glutamate
or to G.A.** Crystals INVENTOR.
Elliott B. Fitch
BY Arthur Middleton
ATTORNEY

* P.C. = Pyrrolidone Carboxylic Acid
** G.A. = Glutamic Acid

Oct. 31, 1950     E. B. FITCH     2,528,047
RECOVERY OF GLUTAMIC COMPOUNDS FROM GLUTAMINE
CONTAINED IN AN IMPURE SOLUTION THEREOF
Filed Dec. 9, 1947     8 Sheets-Sheet 2

Fig. 2ª

Starting Solution
Impure Glutamine-containing Solution
Mixture of Amino Compounds
containing
Neutral & Acidic Amino Acids
including Glutamic Acid, Glutamine and Betaine
and containing Inorganic Contaminating Cations

↓

Loading
such Amino-Compounds along with Inorganic
Impurity Cations from the Starting Solution into a
Cation Exchange Bed
(Column 1.)     *Step I*

↓

Unloading
the Amino-Compounds with $NH_4OH$ from the
Cation Exchange Bed
(Column 1.)     *Step II*

↓

Hydrolyzing
Heat →     Selectively Hydrolyzing the Glutamine in the Unloaded Solution
$NH_3$ ←     to yield P.C.* by
Heating
to drive off free $NH_3$ while leaving some $NH_3$
fixed in salts of P.C.* and G.A.** as Ammonium Glutamate
and Pyrrolidone Carboxylate     *Step III*

↓

Purifying
the Hydrolyzed Solution of the Amino Compounds
by passing it through a
Cations ←     Cation Exchange Bed
and $NH_3$     (Column 2.)
to yield the P.C.* and G.A.** as Acids
in the Amino-Compound Solution freed of
contamination Cations and of $NH_3$ by     *Step IV*
retaining the latter on the Bed INVENTOR.
Elliott B. Fitch
BY
Arthur Middleton
ATTORNEY

↓

- - - - - - - - - -
\* P.C. = Pyrrolidone Carboxylic Acid
\** G.A. = Glutamic Acid Oct. 31, 1950 — E. B. FITCH — 2,528,047
RECOVERY OF GLUTAMIC COMPOUNDS FROM GLUTAMINE
CONTAINED IN AN IMPURE SOLUTION THEREOF
Filed Dec. 9, 1947 — 8 Sheets-Sheet 3

*Fig. 2ᵇ*

Neutral Amino Acids & Betaine

*Separating*
the Purified-Amino-Compound Solution into a
(a) P.C.* and G.A.**-Fraction and a
(b) Neutral Amino Acids & Betaine-Fraction
by passing the Solution through an

*Anion Exchange Bed*
(Column 3.)
Selectively retaining P.C.* and G.A.** on the Bed Step V

*Removing*
Mixture of P.C.* & G.A.** from

*Anion Exchange Bed*
(Column 3.)
With $NH_4OH$ to yield P.C.* & G.A.** as
Ammonium Salts in solution Step VI

*Converting*
P.C.* Salts to Mono Sodium Glutamate or G.A.**
by Boiling under Pressure in the
Presence of Excess NaOH to produce

*Mono Sodium Glutamate*
and adding HCl to acidify to pH 3.2 to produce

*Glutamic Acid*
and cooling to produce
G.A.** - Crystals

Step VII

---

\* P.C. = Pyrrolidone Carboxylic Acid
\*\* G.A. = Glutamic Acid

INVENTOR.
Elliott B. Fitch
BY
Arthur Middleton
ATTORNEY

Oct. 31, 1950 — E. B. FITCH — 2,528,047
RECOVERY OF GLUTAMIC COMPOUNDS FROM GLUTAMINE CONTAINED IN AN IMPURE SOLUTION THEREOF
Filed Dec. 9, 1947 — 8 Sheets-Sheet 4

INVENTOR.
Elliott B. Fitch
BY
ATTORNEY

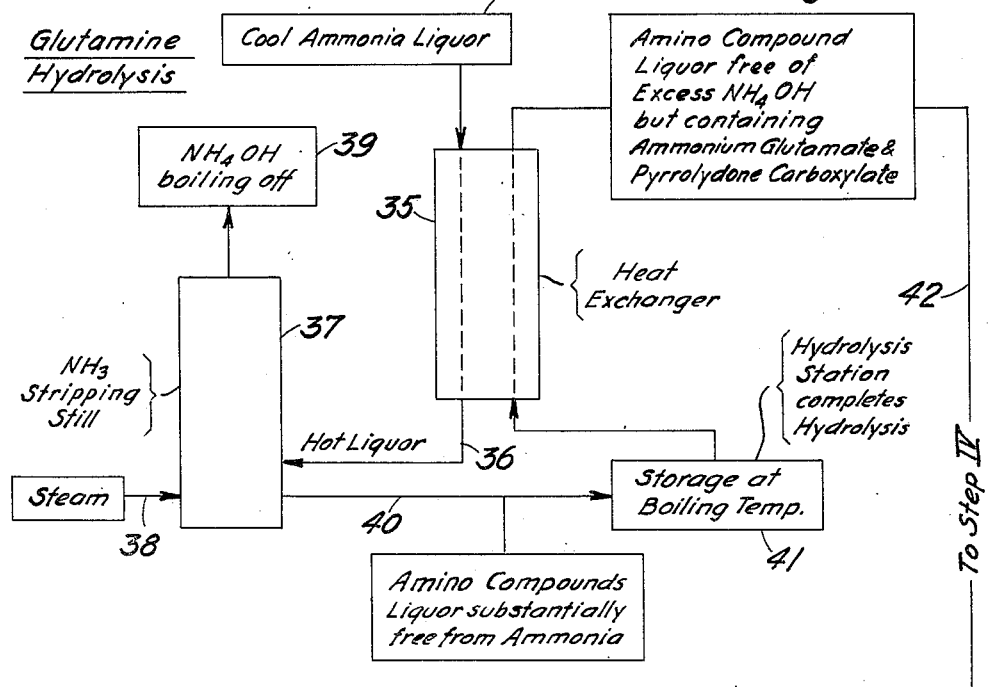
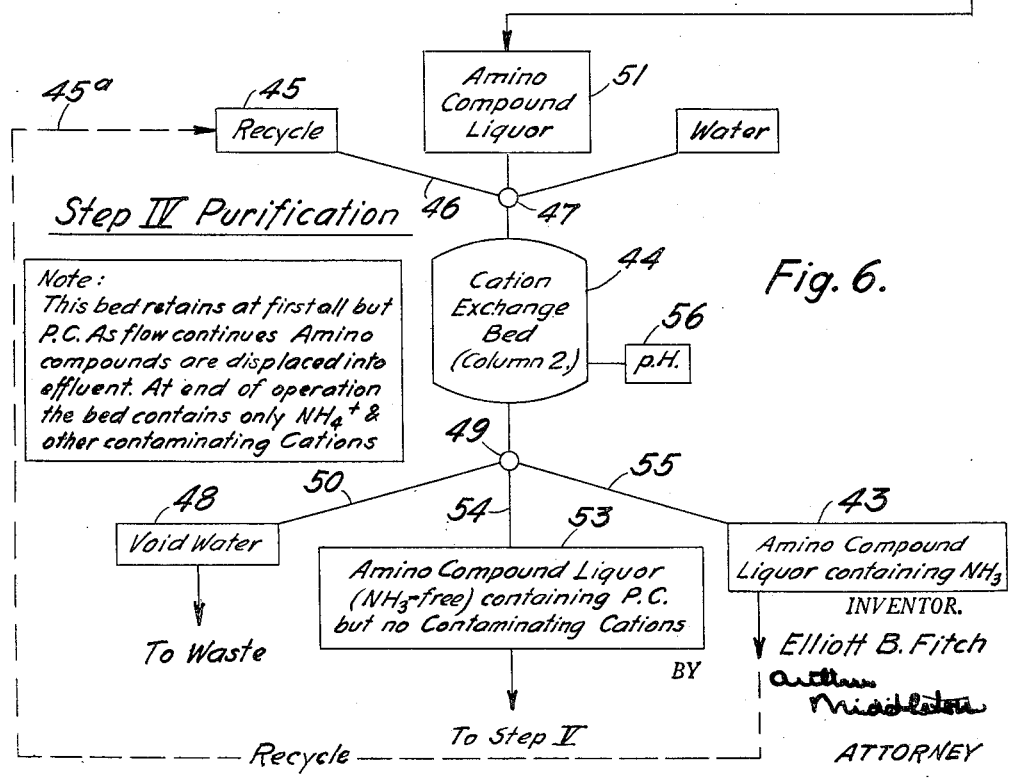

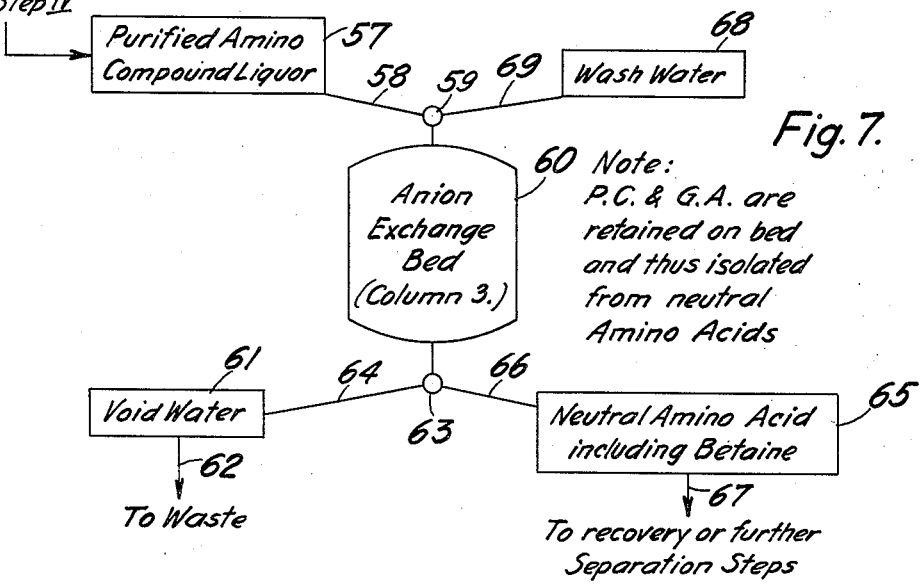
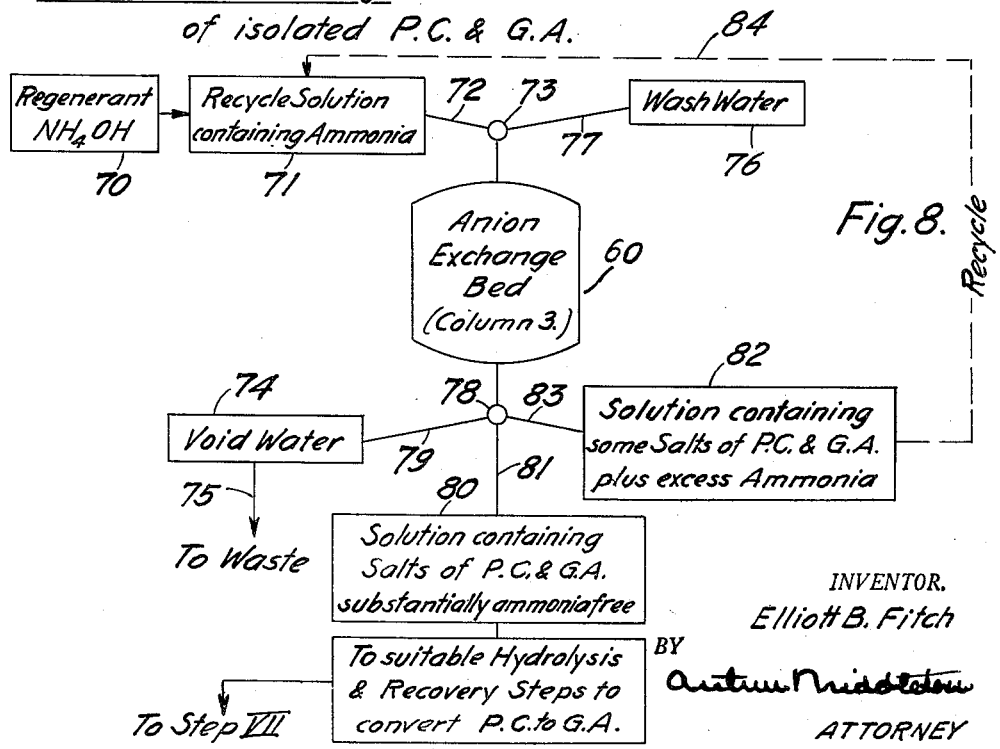

Oct. 31, 1950  E. B. FITCH  2,528,047
RECOVERY OF GLUTAMIC COMPOUNDS FROM GLUTAMINE
CONTAINED IN AN IMPURE SOLUTION THEREOF
Filed Dec. 9, 1947  8 Sheets-Sheet 7

Fig. 9.

Step VII

Converting
P.C. to G.A
by Hydrolysis

From Step VI
↓
Add Excess NaOH, boil, neutralize to p.H. 3.2 with HCl and cool to crystalize G.A.
↓
G.A. crystals That is: Step VII ª

Solution of P.C. & G.A. Salts from Step VI — 85
↓
Excess NaOH — 87 → 86
↓
Hydrolysis by boiling in Autoclave — 88
↓
Add HCl to p.H. 3.2 & cool to crystalize → 89
↓
90 — Separating — 92 Mother Liquor
↓
91
↓
G.A. Crystals INVENTOR.
Elliott B. Fitch
BY
Autumn Middleton
ATTORNEY

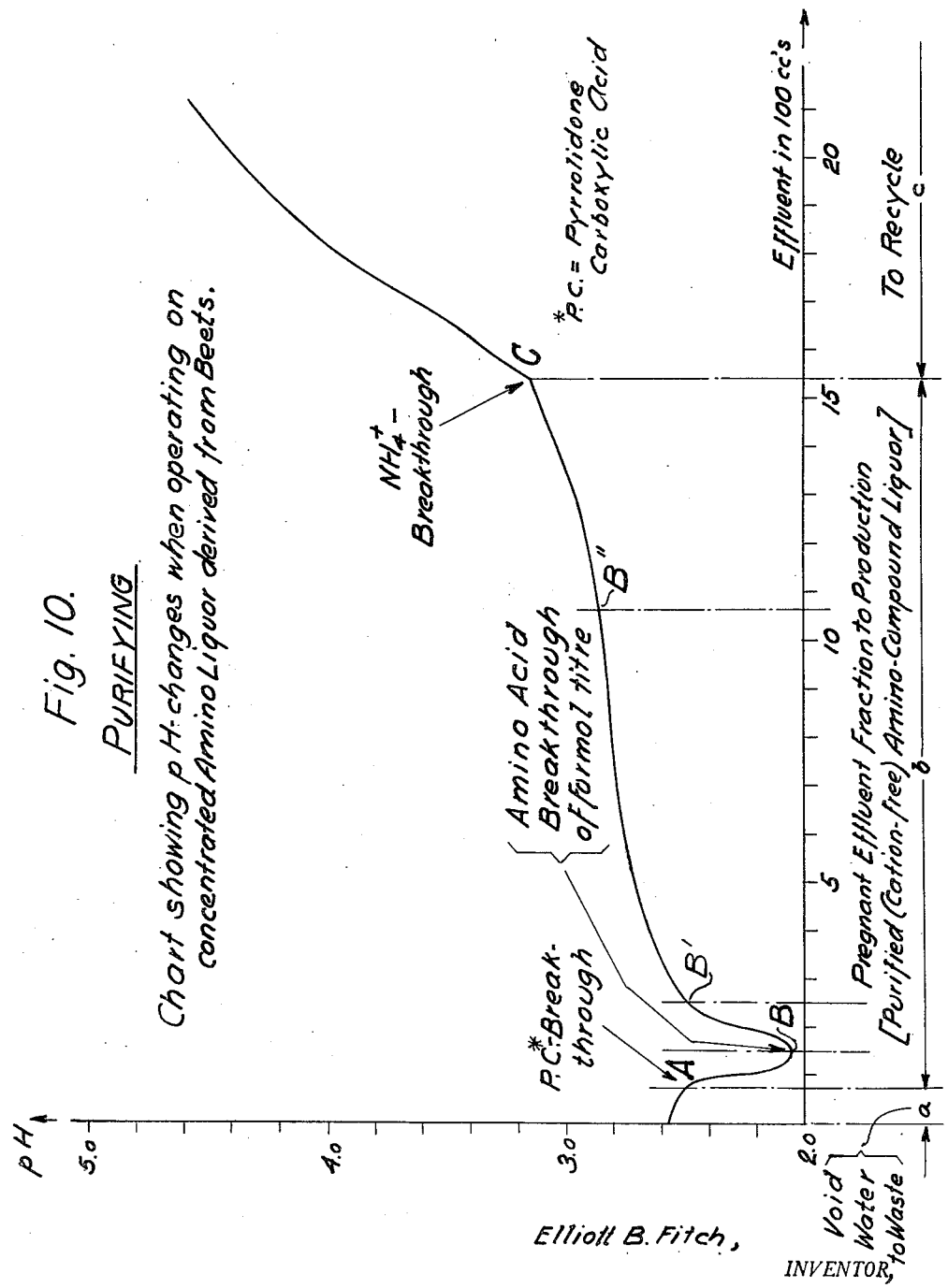

Patented Oct. 31, 1950

2,528,047

UNITED STATES PATENT OFFICE 2,528,047

RECOVERY OF GLUTAMIC COMPOUNDS FROM GLUTAMINE CONTAINED IN AN IMPURE SOLUTION THEREOF

Elliott B. Fitch, Westport, Conn., assignor to The Dorr Company, Stamford, Conn., a corporation of Delaware Application December 9, 1947, Serial No. 790,678

8 Claims. (Cl. 260—527)

This invention relates to a method for deriving substantially pure glutamic acid or salt thereof from a glutamine-containing source, for example from a solution containing the glutamine in mixture with other amino compounds as well as with ionized inorganic impurities or salts.

In a more specific sense this invention relates to by-product recovery as coupled with the purification treatment of sugar-bearing solutions or sugar juices. This invention contemplates the recovery of glutamic acid from the glutamine that is found, for example, in the impure sugar solution extracted from sugar beets. Such beet sugar-bearing solution is also known as diffuser juice, and for the purpose of this invention it may be raw or partially treated as by clarification. Impure sugar solutions of this kind are also known as beet sugar juice or simply as beet juice.

This invention proposes to recover by-product glutamic acid in conjunction with ion exchange purification treatment of the beet juice.

Non-sugars present in the beet juice may be roughly classified as inorganic solutes or ionized salts and are herein briefly termed inorganics, and organic solutes which are not or are only slightly ionized and are herein briefly termed organics. The inorganics comprise, for example, chlorides and sulfates. The organics comprise a variety of nitrogenous compounds such as neutral- and acidic amino acids, which include glutamic acid and glutamine, betaine and some pyrrolidone carboxylic acid, the glutamine being the potential substance for the proposed recovery or isolation of glutamic acid or glutamate.

The removal from a sugar-bearing solution or sugar juice of non-sugar solutes by means of ion exchange treatment involves passing the solution first through a bed of granular cation exchange material which has been saturated with H+-ions by regeneration with a strong mineral acid, such as $H_2SO_4$ of suitable concentration, and then through a bed of granular acid-adsorbing anion exchange material which has been saturated with OH⁻-ions by regeneration with a strong alkali, such as $Na_2CO_3$ of a suitable concentration. Such ion exchange materials may be in the nature of organic material of the synthetic resinous class which are sufficiently acid- and alkali resistant, and which materials are known and commercially available.

While passing through the cation exchange bed the sugar solution receives H+-ions from the bed in exchange for cations being taken up by the bed from the solution, and to the extent of that exchange the solution becomes acidified. Along with these cations the bed also collects from the juice organics which include amino compounds and nitrogenous matter. Cation exchange materials having these qualifications are known and are commercially available.

A criterion of the substantial exhaustion or near-exhaustion of the cation exchange bed lies in the so-called breakthrough that is the point at which impurities of the kind previously adsorbed by the bed begin to reappear in the liquid or juice flowing from the bed. That is, a criterion lies in the fact that the capacity of the bed to yield exchangeable H-ions shows signs of weakening, in that at breakthrough the pH of the acidified effluent begins to rise. Hence pH indications upon the effluent are utilized as criteria of exhaustion or breakthrough of the bed.

Then passing the acidified sugar solution through the bed of anion exchange material will cause the acid in the solution to be adsorbed by the material, so that from the bed flows a substantially neutral as well as pure sugar solution. A clarified sugar juice thus additionally purified and largely freed of impurity solutes renders a proportionately larger yield of crystallized sugar. Indeed the purpose of thus purifying sugar juice to a high degree is to increase the recovery of crystallized sugar, inasmuch as the increase in recovery is somewhat proportional to the amount of impurities thus removed. In other words, the greater the amount of impurities that is left in the juice, the greater is the amount of sugar that is lost to crystallization by being diverted into the residue or molasses to be separated from the crystallized sugar. This anion exchange or de-acidification treatment step is well-known as part of the ionic purification treatment of the sugar juice but may be considered as illustrating the environment of this invention.

As for the process of this invention, after inorganic cations as well as the neutral and acidic amino compounds including glutamine and glutamic acid (herein abbreviated as G. A.) have been collected upon the bed of resinous cation exchange material incident to the purification treatment of the beet juice, this invention proposes to isolate the organics including the amino compounds from the beet juice; subjecting the resulting solution that contains glutamine among the amino compounds, to a hydrolysis reaction by heating whereby the glutamine forms pyrrolidone carboxylic acid (herein abbreviated as P. C.) as a hydrolysis reaction product; then purifying the solution, fractionating or separating the P. C. from other amino compounds, and finally converting the P. C. to glutamate or glutamic acid. The separation of the P. C. is effected by passing the P. C. liquor through a bed of anion exchange material which retains the P. C. while allowing the amino compounds to pass off in the effluent liquor from that bed. The P. C. may then be removed from the anion exchange bed and recovered by the regeneration of the bed with a suitable alkali. Suitable anion exchange material for that bed and for the performance of that treatment stage are known and are commercially available, and they may be in the nature of synthetic resinous anion exchange materials.

Summarizing, this invention proposes to single out and isolate glutamic compound substantially pure directly from the mixture of amino acids, this being in contrast with any such proposals in which for example the mixture is to be treated for effecting its fractionation into groups of acidic-, neutral-, and basic amino acids, with glutamic acid being one of the acidics group. This invention reaches directly into the mixture of such groups and pulls out solely and cleanly the single wanted glutamic compound. This is accomplished by temporarily converting the glutamic compound while in its amino acid mixture from its cationic form into an anionic form, namely pyrrolidone compound for the purpose of making it susceptible immediately to the discrimination capabilities of the ion-exchange materials. This invention combines the pyrrolidone reaction with ion-exchange purification treatment of a sugar solution in such a manner that the glutamic compound is discriminatingly selected out for conversion from its cationic form into an anionic form which in turn enables it to be selected with great precision by the cation-exchange material from the other companion amino acids which remain cationic.

Thus, following its conversion into the anionic pyrrolidone form the glutamic compound is effectively isolated substantially pure by the exchange material from its cationic companion acids in the mixture. The thus isolated pyrrolidone compound may be converted to glutamic acid or glutamate.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a condensed written presentation of the sequence of operating steps leading from the glutamine-containing starting solution or beet sugar juice to the glutamate or glutamic acid derived therefrom;

Figs. 2$^a$ and 2$^b$ taken together in continuity present the invention similar to Fig. 1 although not as condensed;

Fig. 5 shows the step of hydrolyzing the glutamine to form P. C. while driving off excess ammonia;

Fig. 6 shows the step of purifying the hydrolysis liquor of its contaminating cations by means of a second cation exchange bed, while using pH effluent criteria to obtain a purified P. C. fraction;

Figure 3:
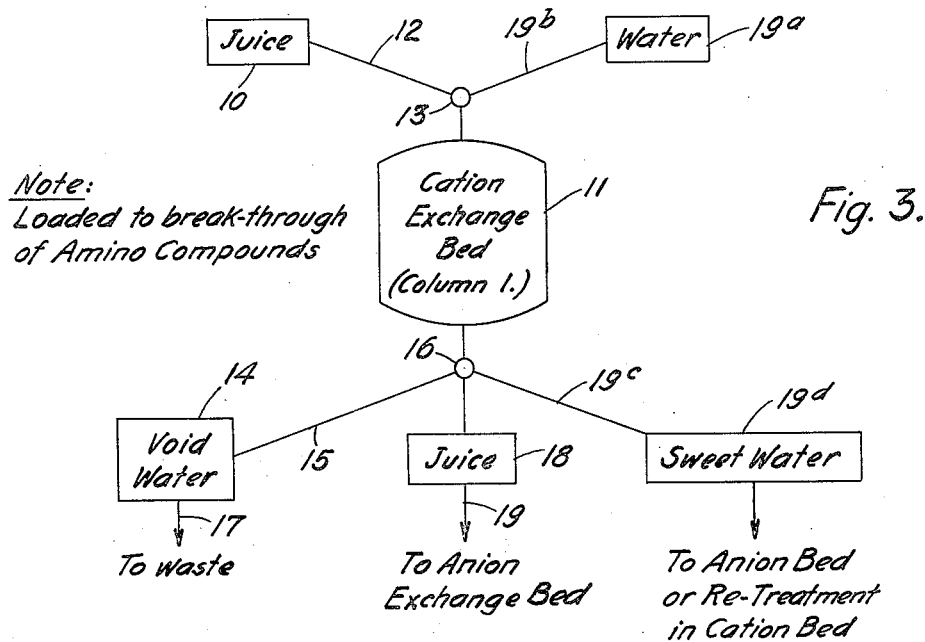
Fig. 3 shows the step of loading a cation exchange bed indiscriminately with cations and organics including amino compounds.

Fig. 7 shows the step of separating the purified amino compound liquor by selective retention of the P. C. and G. A. present on an anion exchange bed, while neutral amino compounds (neutral amino acids and betaine) pass off in the effluent;

Fig. 8 shows the step of removing the retained P. C. and G. A. from the anion exchange bed;

Fig. 9 shows the step of converting the P. C. to G. A.;

Fig. 10 is a graph representing effluent pH criteria whereby the effluent fractionation in the purification step (Fig. 6) is governed.

According to Figs. 1 and 2 the starting solution is an impure glutamine-containing solution mixture of amino compounds, that is more specifically a mixture containing neutral- and acidic amino acids including glutamic acid, glutamine and betaine and also containing contaminating inorganic cations, which starting solution, for example diffusion beet juice, is subjected to the following treatment steps I to VII:

Step I comprises passing the starting solution or juice through a bed of cation exchange material (herein later on identified as column 1) whereby the juice gives up cations as well as amino compounds, such as the neutral- and the acidic amino acids, being collected upon the bed, while H-ions are being released into the juice acidifying the same. Exhausting or saturating the bed in this way is herein called loading the respective cation exchange bed.

Step II comprises removing the amino compounds from the bed, which is herein termed unloading, by means of a suitable base, for example NH$_4$OH, to derive a glutamine-containing effluent solution of the amino compounds which herein will be called impure amino compound liquor.

Step III comprises subjecting the impure amino liquor to a treatment such as heating to effect hydrolysis of the glutamine as well as to effect the driving off of free NH$_3$ which may be present where NH$_4$OH has been the unloading solution, to produce a solution containing pyrrolidone carboxylic acid as a reaction product of the glutamine hydrolysis, the resulting liquor being herein called hydrolyzed amino compound liquor.

Step IV comprises purifying the amino compounds in the hydrolyzed impure amino liquor of contaminating inorganic cations by passing the liquor through a bed of resinous cation exchange material (herein identified as column 2) similar to that upon which the inorganic as well as the organic impurities were originally collected or loaded, thereby selectively retaining upon the bed the contaminating cations, while there results an effluent solution containing substantially pure the amino compounds including glutamic acid as well as pyrrolidone carboxylic acid, herein abbreviated as G. A. and P. C. respectively, which effluent solution will herein be called purified amino compound liquor.

Step V comprises fractionating or separating the purified amino liquor into one fraction containing substantaily all of the pyrrolidone carboxylic acid (P. C.) and anothed fraction containing substantially all the neutral amino acids along with betaine, by passing the solution through a bed of resinous anion exchange material (herein identified as column 3) which selectively retains P. C. and G. A. while allowing the neutral amino acids along with betaine to pass as effluent solution from the bed.

Step VI comprises removing the P. C. and G. A. from the anion exchange bed (column 2) by means of a suitable unloading solution or base, such as NH₄OH, whereby there is obtained an effluent solution containing the glutamic fraction and herein termed glutamic liquor.

Step VII comprises treating the glutamic liquor to convert the P. C. into G. A. as by a suitable hydrolysis reaction, and subjecting the G. A. solution to crystallizing treatment.

*Detailed description of the process*

The starting material.—According to one preferred form of this invention substantially raw diffuser juice is subjected to the above outlined treatment of glutamic acid recovery, the word recovery being used also to connote the presence of glutamine from which the glutamic acid is to be formed.

Glutamic acid or potential glutamic acid may be present in beet juices in the form of glutamic acid as such and of glutamine respectively.

Some pyrrolidone carboxylic acid is also present initially in the beet juice. While it is improbable that this compound exists to any considerable extent in the sugar beet itself, it is presumably formed from glutamine during processing, that is during the extraction or diffusion treatment, since glutamine is unstable and decomposes readily in the juice upon heating to yield ammonia and pyrrolidone carboxylic acid. It is therefore proposed to operate upon the juice as soon as feasible after its diffusion from the beets, and before the juice has been detained at an elevated temperature.

In the loading phase of the process as represented by step I the beet diffusion juice is passed through a bed of organic resinous cation exchange material substantially in the manner of the cation exchange phase of known ionic purification treatment, also called deionization treatment of liquids. It is advantageous to use in this loading operation a two-bed system, whereby the juice passes through a pair of such exchange beds in series, to the end of attaining greater efficiency in the unloading step that follows, as well as greater regeneration efficiency. A container or tank containing a bed of exchange material is herein also termed an exchange cell or simply cell. By thus operating two cation exchange beds in series whereby the juice flows first through the up-stream cell and then through the down-stream cell, it is possible to load each bed to substantially full capacity. That is to say, at or just before break-through of the down-stream cell, the up-stream cell is sweetened off by displacing or washing residual juice therefrom, and removed or disconnected from the juice flow for unloading according to step II above referred to. That is, the down-stream cell is then placed in the up-stream position, while a freshly regenerated cell is placed in the down-stream position. Thus each individual cell becomes sequentially the down-stream cell, then the up-stream cell, and finally is removed from the juice flow for unloading.

That is to say, when a cell is first put into operation, it is in the down-stream position and receives the effluent from the cell that is in the up-stream position. The effluent of the then down-stream cell thus consists first of displaced void water and then of acidified juice freed of cations which may then be passed on to the succeeding step of ionic purification, namely the anion exchange or de-acidifying phase of the ionic purification of the juice, and further on to the evaporation and sugar crystallization steps. At or before the break-through of cations in the effluent from the down-stream cell that cell is shifted, as by connections, to the up-stream position, and is fed raw juice until either it is fully loaded or exhausted or else until the down-stream cell breaks through, a fresh cell having previously been placed in the down-stream position. The up-stream cell is then sweetened off and subjected to the treatment steps leading to glutamic acid recovery as by the practice of this invention.

However, single-bed loading operation is shown for the sake of simplicity, in the diagrammatic illustration of Fig. 3.

That is to say, according to Fig. 3 a sugar-bearing liquid, such as raw beet diffusion juice indicated at 10, from which amino compounds are to be isolated, is fed to tank 11 containing a bed of cation exchange material, herein also identified as column 1. Thus the juice passes along line 12 and by way of a two-way valve 13 to and downwardly through the bed of column 1, displacing first residual or void water 14 from the voids or spaces between the granules of the exchange material of the bed, which void water passes from the bed along line 15 by way of a three-way valve 16. The void water indicated at 14 may pass to waste as indicated at 17. As the juice flow through the bed continues the void water is followed by acidified although cation-free juice indicated at 18 flowing from the bed through valve 16, to be passed on to anion exchange treatment for de-acidification as indicated at 19. When the bed is exhausted residual juice is displaced therefrom by wash water indicated at 19ª passing to the top of the bed along line 19ᵇ and through the valve 13. The dilute tail end portion of the residual juice thus being displaced is passed from the bed through valve 16 and along line 19ᶜ as sweet water indicated at 19ᵈ.

The juice flow is allowed to continue through the bed of column 1 until the bed is sufficiently exhausted or loaded, such condition being indicated for example by the break-through of amino compounds. This specific break-through of amino compounds is explained by the fact that the cation exchange material has inherent selective characteristics or preferences with respect to the inorganic- and the organic impurities respectively. That is to say, the material in collecting the impurities has a greater affinity for the cations than for the organic or amino compounds. Hence, after substantially the total capacity of the bed has been exhausted by combined quantities of cations and organics, if the flow of juice through the bed is continued, the bed will continue to collect cations of the inorganics while rejecting organics, and in fact will collect additional inorganics only by displacing a corresponding quantity of previously collected organics from the bed, hence the criterion of the above mentioned organics break-through.

Figure 4:
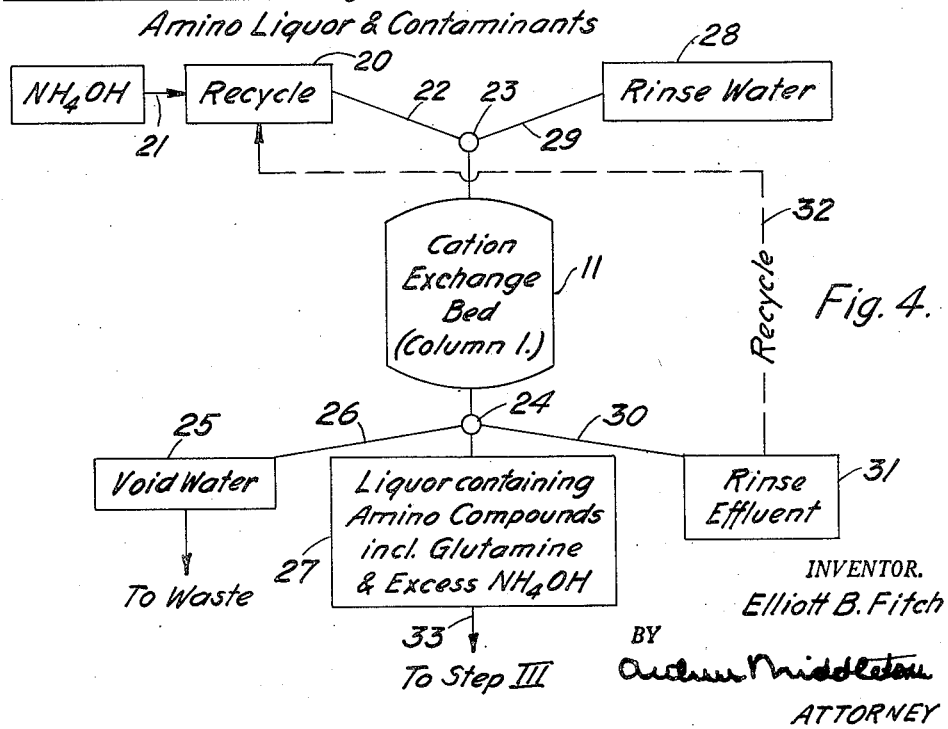
Fig. 4 shows the step of selectively unloading the amino compounds from the cation exchange bed.

As illustrated in Fig. 4 the selective unloading of the amino compounds from the cation exchange bed of column 1 is effected by a solution of NH4OH, although in principle any strong base might be used to elute or unload the desired amino compounds from the loaded cation exchange bed. That is to say, the NH4OH removes from the loaded bed the neutral and acidic amino compounds which include glutamic acid and glutamine, but does not remove inorganic cations to any appreciable degree. The resulting effluent is the above defined impure amino liquor which may contain an excess of NH4OH which is removable by distillation.

According to the Fig. 4 example of unloading there is first passed through the bed rinse water effluent obtained at the end of a previous unloading operation. This rinse water is made up to a desired and suitable volume and reinforced with ammonia sufficiently to attain a suitable strength, such as about 1 normal in NH4OH. A sufficient quantity of NH4OH is fed to and passed through the bed to effect the desired removal of amino compounds therefrom. Such an approximate quantity may be said to be equal to 3½ times the bulk volume of the resinous cation exchange material being unloaded. Following this unloading phase proper the bed is washed by passing therethrough rinse water to displace residual solution, the resulting effluent again to serve as recycle solution for a subsequent unloading operation.

Accordingly Fig. 4 illustrates step II by indicating recycle solution 20 reinforced by NH4OH as indicated by arrow 21. The recycle solution thus brought up to the desired strength passes along line 22 and by way of a two-way valve 23 to and downwardly through the cation exchange bed of column 1. The resulting effluent passes from the bottom of the bed and through a three-way valve 24 whereby effluent fractions or cuts can be effected. That is, first an effluent volume of residual or void water 25 is derived from the bed by way of line 26, and then a volume of solution or liquor indicated at 27, that is the impure amino liquor containing amino compounds including glutamine as well as excess NH4OH. Rinse water indicated at 28 follows the recycle solution into and through the bed by way of line 29 and the valve 23, producing at first the final effluent portion of the impure amino liquor and then along line 30 the final effluent volume indicated at 31 as rinse effluent containing excess NH4OH for use as recycle solution in a subsequent unloading operation, such recycling being indicated by the dotted line 32. The impure amino-liquor 27 is passed on to the next treatment step, namely step III, as indicated by arrow 33.

Thus in Fig. 5 the impure amino liquor is subjected to treatment involving a hydrolysis reaction whereby the glutamine present is converted to pyrrolidone carboxylic acid (herein designated as P. C.). This invention proposes to effect this conversion by heating, and to subject the resulting hot liquor to a distillation operation for the purpose of driving off and recovering excess ammonia contained in the liquor. Thus the treatment comprises preheating by passing the impure amino liquor through a heat interchanger then through a distilling tower supplied with steam to fractionate off the free ammonia for recovery in relatively concentrated form, and finally through a heated storage tank dimensioned to provide about 8 hours detention time at boiling temperature whereby hydrolysis decomposition of the glutamine is completed.

Decomposition of the glutamine to the ammonium salt of pyrrolidone carboxylic acid takes place according to the following equation:

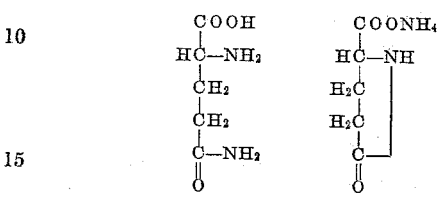

Accordingly in Fig. 5 the impure amino liquor substantially of room temperature and containing free ammonia, for the purpose of this treatment step also termed cool ammonia liquor, indicated by numeral 34, is fed to and passed through a heat interchanger 35 from which it flows as hot liquor indicated by line 36 to a distilling still 37 to strip the NH3 from the liquor and therefore herein also termed the NH3-stripping still. Live steam indicated at 38 enters the still and effects the boiling off of the NH4OH as indicated at 39, while at the same time a portion of the glutamine is hydrolyzed producing P. C. Amino-liquor substantially free from ammonia indicated at 40, passes from the still to a storage tank indicated at 41 in which the liquor is maintained at boiling temperature sufficiently long to allow the balance of the glutamine to be hydrolyzed to produce P. C. The resulting hydrolyzed amino compound liquor free of excess NH4OH but otherwise still impure due to its contents of contaminating cations is then passed on along line 42 to treatment in step IV to effect purification.

The hydrolyzed amino-compound liquor thus to be purified after distilling off excess ammonia and hydrolysis of glutamine still contains some ammonia in the form of ammonium salts of glutamic acid and pyrrolidone carboxylic acid, which according to this treatment step (step IV) is removed by way of selectively collecting it on a bed of resinous cation exchange material, herein also designated as column 2, the material being similar to that of the bed of column 1 of steps I and II.

That is to say, because NH3 has a greater affinity for the cation exchange resin than the amino-compounds present, or otherwise expressed because the exchange material has a preference for the NH3 over the amino compounds these breakthrough and appear in the effluent when the bed becomes sufficiently exhausted, before the NH3 breaks through. In other words the bed retains at first all but pyrrolidone carboxylic acid. As the flow through the bed continues causing exhaustion of the bed, amino compounds are displaced by NH4+ and contaminating cations and consequently appear in the effluent. When NH3-breakthrough occurs, the flow through the bed is discontinued and the bed regenerated in the known manner with a suitable acid such as H2SO4. In this step two or more beds or cells may be operated in series by passing the liquor sequentially through them. At NH3-breakthrough of the down-stream cell a freshly regenerated cell is placed in operation down-stream from it and connected in series with it. At the same time the initial upstream cell of the series is removed from the series for regeneration. Further exhaustion of what has now become the upstream cell brings about displacement therefrom of substantially all the absorbed amino compounds. Thus substantially all the amino compounds are displaced from the bed and isolated in a corresponding fraction of the effluent volume, while $NH_3$ remains adsorbed on the bed.

If any amino-compounds which it is desired to recover should remain adsorbed on the exhausted bed that has been removed from the series, they can be stripped from the bed with an ammonia solution, and the resulting effluent be returned to step III for distillation.

When effluent from an upstream cell is fed to a down-stream cell the resulting effluent from the down-stream cell first displaces void water residual in the bed from a preceding washing or rinsing operation, followed by ammonia-free solution containing essentially only pyrrolidone carboxylic acid. Thereafter amino acids and betaine will also appear in the effluent along with the P. C. When the ammonia breakthrough occurs the flow through the bed is stopped in order that a fresh acid-regenerated cell may be installed in the down-stream position.

As exemplified by a single bed operation in Fig. 6 the purification of the amino-compound liquor according to step IV is carried out as follows:

Amino-compound liquor indicated at 43 only partially purified and representing the trailing effluent volume saved from the loading phase of a preceding cyclic operation of step IV, is first passed through a cation exchange bed 44 herein also termed column 2, of the treatment system, this saved solution herein being termed recycle solution and as such indicated at 45, the recycling being indicated by the dotted line 45ª. The recycle solution passes to the bed along line 46 and through a three-way valve 47 flows downwardly through the bed displacing therefrom residual rinse water or so-called void water indicated at 48 coming as effluent from the bottom of the bed through a three-way valve 49 and along line 50. First run amino-compound liquor from step III indicated at 51 is then passed to the bed through the three-way valve 47 and flowing downwardly through the bed it produces as the productive effluent portion or fraction a volume representing purified amino-compound liquor containing amino acids, betaine, and pyrrolidone carboxylic acid substantially free of $NH_3$ and contaminating cations, this effluent volume being indicated at 53 having passed from the bottom of the bed by way of the three-way valve 49 and along line 54. This volume or fraction of purified liquor is passed on to the treatment of step V for further fractionation of the amino-compounds.

However, at $NH_3$-breakthrough, that is when $NH_3$ begins to show in the effluent indicating a corresponding state of exhaustion of the bed, the effluent is diverted through three-way valve 49 and along line 55 to provide an effluent fraction representing a volume of partially purified amino-compound liquor to be saved in order to serve as recycle solution in a subsequent operating cycle of this treatment step.

In order to effect the proper cut between the purified amino-compound liquor fraction and the recycle liquor fraction in step IV, advantage is taken of certain pH criteria of the effluent liquor, a pH indicator being diagrammatically shown at 56, at the effluent end of the bed. When the pH is plotted as a function of the volume of effluent liquor passing from the bed, the criteria for the amino-compound breakthrough and subsequently for the $NH_4$-breakthrough are represented by respective breaks or marked directional changes of the curve representing the pH values. Also there appears in this diagram an initial directional change representing the P. C. (i. e. pyrrolidone carboxylic acid) breakthrough. An example of such criteria is given in the diagram of Fig. 10, showing the effluent pH measured on the ordinate as a function of the effluent volume measured on the abscissa, the point of intersection of the ordinate with the abscissa being indicated at O. This represents the purification treatment step in the form of a chart showing pH changes when operating on concentrated amino liquor derived from beets. Directional changes in the curve represented by this diagram include the P. C.-breakthrough at A, the amino acid breakthrough at B, and the $NH_4$-breakthrough at C. In view of these characteristics of the pH curve the effluent is divided into the following fractions: (a) void water volume going back to waste; (b) pregnant effluent volume going to production, consisting of purified amino compound liquor containing P. C. and amino compounds although free from $NH_4^+$ and contaminating cations; and (c) recycle volume.

The purified effluent fraction of amino-compound liquor resulting from step IV containing besides the pyrrolidone carboxylic acid substantially only neutral amino acids, betaine, and some glutamic acid, is then subjected to the separation or fractionation treatment of step V in order to isolate pyrrolidone carboxylic acid together with whatever glutamic acid is present.

To this end the amino-compound liquor is passed through a bed or cell of resinous anion exchange material. This being in effect an acid-adsorbing material it retains or adsorbs the pyrrolidone carboxylic acid and the glutamic acid while rejecting the neutral amino acids as well as the betaine. That is the neutral amino acids and the betaine escape into the effluent. In other words, liquor is allowed to pass through the anion exchange bed until breakthrough of glutamic acid or pyrrolidone carboxylic acid is reached or is imminent. Water is then passed through the bed to rinse it free of residual liquor before the cell is subjected to the next treatment step, namely step VI, for the purpose of removing the adsorbed glutamic acid and pyrrolidone carboxylic acid from the bed.

The fractionation or separation of pyrrolidone carboxylic and glutamic acids according to step V in Fig. 7 is carried out as follows:

Purified amino-compound liquor indicated at 57 from step IV is passed along line 58 and through a two-way valve 59 to a bed of anion exchange material 60 also termed column 3 of the treatment system. The resulting first effluent is displaced void water as indicated at 61 residual in the bed from a preceding washing of the bed, which may be sent to waste as indicated at 62, the void water passing from the bed through a two-way valve 63 and along line 64. As the flow of the liquor continues the anion exchange bed collects or becomes saturated with the pyrrolidone carboxylic and glutamic acids while an effluent fraction containing neutral amino acids and betaine indicated at 65 through the two-way valve 63 and along line 66, to be sent to recovery or further separation steps as indicated by arrow 67. Wash water indicated at 68 may follow the amino compound liquor through the bed passing thereto along line 69 and through the two-way valve 59. Then may follow the removal from the bed of the pyrrolidone carboxylic and glutamic acids.

In step VI, therefore, by way of regenerating the anion exchange bed, there is passed therethrough a solution of any suitable hydroxide, for example NH4OH or NaOH, whereby pyrrolidone carboxylic acid and glutamic acid are removed from the bed as salts in solution in the resulting effluent herein termed glutamic liquor. An effluent liquor containing these glutamic values may also be derived by passing through the bed a displacing solution of compounds having relatively greater affinity with respect to the anion exchange material and, therefore, capable of displacing the glutamic values from the bed.

It is desirable to remove the two acids from the anion exchange bed in a minimum volume of liquor, that is as relatively concentrated as possible, inasmuch as it is contemplated to have this liquor eventually subjected to evaporation in the recovery of glutamic acid crystals. It is therefore proposed to operate this anion exchange bed in recycle fashion similar in principle to the recycling operations herein already described as in steps II and IV.

Step VI as illustrated in Fig. 8 shows a bed or cell 60 of anion exchange material also designated as column 3, its operation being indicated by the use for example of NH4OH as a regenerant- or removing solution.

A supply of NH4OH solution indicated at 70 provides regenerant chemical for bringing the recycle solution up to a desired strength. Recycle solution being fed to the bed and indicated at 71 passes along line 72 and through a two-way valve 73, displacing residual or void water as indicated at 74 from the bottom or effluent end of the bed to waste indicated at 75. After sufficient solution has passed to the bed to effect the removal of the P. C. and G. A., wash water indicated at 76 is passed to the bed along line 77 and through the two-way valve 73. The resulting effluent from the bed consists first of the residual or void water indicated at 74 being displaced from the bed through a three-way valve 78, along line 79. This is followed by an effluent fraction represented by a solution containing salts of P. C. and G. A. substantially free of excess hydroxide indicated at 80, this fraction passing from the bed through the valve 78 and along line 81. This is the production fraction in that it is sent to further treatment as in the subsequent step VII to effect conversion of the P. C. into glutamic acid, and it is the fraction which is herein termed the glutamic liquor.

The next following effluent fraction from the anion exchange bed consists of solution still containing salts of P. C. and G. A. and also containing excess hydroxide. This fraction being indicated at 82 flows from the bed through the three-way valve 78 and along line 83, to be saved for use as recycle solution in the next operating cycle of this bed, as indicated by the dotted line 84.

The production fraction or glutamic liquor containing the isolated P. C. obtained from step VI is then subjected to treatment whereby the P. C. is converted into glutamic acid.

According to treatment step VII in Fig. 9 the conversion of P. C. to G. A. is effected by adding excess NaOH, bringing the solution to boiling temperature, neutralizing it with HCl to a pH of 3.2 to produce the glutamic acid salt as glutamic acid, and cooling the solution to precipitate G. A. crystals. That is to say, during hydrolysis P. C. undergoes a molecular reaction to yield glutamate. Therefore, neutralizing with HCl following hydrolysis renders the glutamic acid salt as glutamic acid.

This conversion phase is presented in greater detail in step VII$^a$ of Fig. 9. The glutamic liquor or solution of P. C. and G. A. salts from step VI indicated at 85 is passed to a dosing stage indicated at 86 where excess NaOH indicated at 87 is added. The solution is then passed to an autoclave indicated at 88 where hydrolysis of the P. C. salt is induced by the boiling of the solution. The hydrolyzed solution is passed to a crystallizing stage indicated at 89 which involves the addition of HCl to bring the solution to a pH of 3.2 to render the resulting glutamic acid salt as glutamic acid and cooling it to effect precipitation of glutamic acid crystals from the mother liquor. Next the glutamic acid crystals are separated from the mother liquor as indicated by a separating stage 90 from which the separated crystals are derived along path 91 and mother liquor along another path 92.

An alternative mode of operation of step VII is as follows:

The production fraction of glutamic liquor containing the isolated P. C. obtained from step VI may be subjected to a treatment whereby the P. C. is converted directly into mono-sodium glutamate. For example, an excess of NaOH can be added to the P. C. solution and the P. C. salt converted into the glutamate salt by hydrolysis. The excess hydroxide can then be removed from the liquor, as by selective adsorption on a cation exchanger, or can be neutralized either with free acid, or by treating with appropriate salts of a base separable in the free form, and then subsequently removing the free base from the liquor. Evaporation of the liquor will then produce a crop of mono-sodium glutamate crystals.

After separating the crop of mono-sodium glutamate the mother liquor could be returned to the evaporator for further concentration. A portion of the mother liquor may be bled to purge impurities, and be returned to an appropriate point in the process for recovery of glutamic values.

Suitable bases separable in the free form include ammonia, and anion exchange resin. That is, in the foregoing the excess hydroxide can be neutralized by adding a salt of either ammonia or of an anion resin. By a salt of an anion resin is meant an anion resin which has been rendered more or less completely into the acid exhausted form. The base can be removed subsequently in the free or uncombined form by distillation if ammonia, or by filtration if anion resin.

More specifically, and by way of illustration, step VII can be operated as follows:

Glutamic liquor comprising the ammonium salts of P. C. and G. A. is fed directly into an evaporator. A recycled alkaline hydrolysate is also fed to the evaporator. The alkalinity of the recycled liquor is so controlled that the excess NaOH will be roughly equivalent to the anions in the incoming glutamic liquor. Ammonia is evolved in the evaporator, and the evaporator liquor assumes a pH not substantially above 7.0. Evaporation is carried on to produce a crystal crop of mono-sodium glutamate and the slurry so produced is centrifuged to recover the solids. NaOH is added to the mother liquor, which is heated to boiling, maintained at this temperature long enough to hydrolyze a substantial portion of the pyrrolidone carboxylic acid salt contained, and then is returned to the evaporator as the above mentioned alkaline recycle.

The following is a description and discussion of operating criteria, with the aid of which I have carried out the process of this invention:

Breakthrough of amino compounds during the loading step, or step I of Fig. 1, is indicated by a pH rise in the effluent, following a period of relatively constant pH. This is indicated in the following table, which gives data for a run of raw diffuser beet juice passed at 13 G. P. M. through an acid regenerated cation exchange column containing 16 cu. ft. of exchange resin.

The extent of loading (see also Fig. 3) was determined by the following.

*Table I*

[Loading of raw diffuser beet juice]

| Minutes Run | pH of Effluent | Comment |
|---|---|---|
| 10 | 2.2 | |
| 30 | 1.94 | |
| 40 | 1.96 | |
| 50 | 1.97 | |
| 60 | 1.97 | Amino breakthrough |
| 65 | 2.0 | Juice flow stopped, wash started. |
| 70 | 2.2 | |

An advantageous mode of operating the process is to measure the pH of the percolating solution at some distance from the bottom of the bed of exchange resin, so chosen that if the flow of juice be discontinued as soon as the pH indication of amino compounds is observed, and the juice then remaining entrained in the void spaces of the bed of exchanger be displaced with wash water, the amino compounds will just avoid breaking through into the effluent at the finish of this operating step.

The principal operating criterion for the amino liquor purifying step, in which $NH_3$ and residual contaminating cations are removed from the liquor, is shown in the chart of Fig. 10. These data were obtained using amino liquor derived from raw beet juice as follows:

Raw beet juice was passed through a cation exchange cell as shown above in Table I. After washing out entrained juice, the cell was unloaded with 20 cu. ft. of 2 normal $NH_4OH$. The unloading effluent and a following rinse were collected as impure amino compound liquor. This liquor was boiled to decompose glutamine to form pyrrolidone carboxylic acid, i. e. P. C., and to concentrate the liquor for storage and shipping. The concentrated amino liquor had a volume equal to $1/40$ the volume of the juice from which it was derived, and about $1/11$ the volume of the unconcentrated amino liquor.

The concentrated amino liquor was passed through a laboratory cell containing 157 cc. of acid regenerated cation exchange resin. The effluent was collected in 100 cc. portions, which were analyzed for acidity, cations and amino acid groups. The solid curve of Fig. 10 represents graphically a reconstruction of the instantaneous pH of the effluent.

The first 100 cc. effluent comprises in part residual wash water displaced from the voids in the exchange bed. The remainder consists of amino liquor from which $NH_3$, cations and also amino compounds have been removed, but which contains pyrrolidone carboxylic acid. In preferred operation, a first portion of the effluent consisting only of displaced void water might be segregated and discarded, while subsequent portions would be retained for processing. The point of P. C. breakthrough is indicated by a downward break in the pH of the effluent, such as shown on the solid curve of Fig 10 at point A.

During the second 100 cc. effluent portion amino acids also broke through into the effluent as at point B.

In successive effluent portions following amino acid breakthrough at point B the pH rises because of the appearance of amino compounds which have the property of buffering the solution. That is, the amino compounds have the property of reacting in the solution in a manner which tends to move the pH of the solution towards some value which is different but characteristic for each such compound, and is higher for all than the pH range of the unbuffered effluent found in my process. Thus the appearance of amino compounds in the effluent causes a rise in pH as represented by the portion B—C of the graph. At first the rise is (as from B to B') rapid, because immediately following amino acid breakthrough the concentration of amino acids in the effluent rises rapidly. Subsequently the rise in pH becomes less rapid, because the concentration of amino acids on the whole increases less rapidly as represented by the portion B'—C of the graph.

As $NH_4^+$ or other cation breakthrough at point C is approached, there is a slight upward trend of the curve as represented by the slightly concave portion B''—C thereof. Thus the portion B'—C includes a first section B'—B'' which is slightly concave and a second portion B''—C which is slightly convex, with a smooth transition of the one into the other.

Because of the breakthrough of $NH_4^+$ or contaminating cations at point C, the pH curve breaks sharply upward. This occurred during the 16th effluent portion in Fig. 10, and shows clearly in the curve. At this point the effluent becomes contaminated with cationic impurities. Effluent preceding this point is advanced to the succeeding step in the process, namely separating as shown in step V (see Figs. 1 and 7). Impure effluent following this breakthrough at point C may be saved for recycle.

The actual shape of the pH curve for effluent from the purifying cell, as shown in Fig. 10, will vary, depending largely upon the relative concentrations of the various constituents of the amino liquor. However, in operating upon amino liquors derived from impure sugar syrups or juices from various points in the proceess of beet sugar manufacture, I have always been able to identify the $NH_4^+$ or cation breakthrough point through a sharp break in the pH curve as exemplified at point C in Fig. 10.

Following the cation breakthrough at point C, I prefer to continue to pass amino liquor through the purifying cell in order that the adsorbed amino acids may be displaced and eluted through exchange with the cations of the influent liquor. Thus the exchange cell finally will retain adsorbed essentially only said cations, and little or none of the amino compounds. When this condition is reached, the pH of the effluent from the cell becomes substantially identical to that of the influent. Thus approximate identity of influent and effluent pH may be taken as an operating criterion for substantially completed elution from the bed of amino compounds, and thus for terminating the liquor flow, rinsing the cell, and regenerating.

The separating step is a simple deacidification of the purified amino liquor by means of an acid-adsorbing anion exchange material. Breakthrough of acidity, namely as pyrrolidone carboxylic acid and glutamic acid, can be detected through a drop in the pH of the effluent which up to breakthrough will be in the vicinity of neutrality or pH 7.

While the foregoing embodiment of this process includes the feature that P. C. and G. A. present in the hydrolysis liquor resulting from step III (Fig. 5) are recovered in mixture by a sequence of steps including purification (step IV, Fig. 6); separating (step V, Fig. 7), and removing (step VI, Fig. 8), there will now be described a simplified embodiment which would apply in case the G. A. content of the hydrolysis liquor from step III (Fig. 5) is negligible or is to be neglected. In that case the purification step (step IV, Fig. 6) may be carried out as follows:

The hydrolysis liquor from step III (Fig. 5) is passed through a cation exchange bed whereby again contaminating cations are retained by the bed while P. C. passes off with the effluent. Inasmuch as the G. A. content, if any, is to be neglected, this embodiment proposes to make a fractionating cut at point B so as to separate a purified effluent fraction containing substantially only P. C., this fraction or volume being indicated by the distance $d$ on the ordinate. This fraction can then be converted into glutamic acid or a salt thereof in the manner indicated in step VII (Fig. 9).

A subsequent effluent volume may be recycled.

*The cation exchange materials*

Within the concept and scope of this invention any one of a variety of cation exchange materials would be suitable or workable in either of the cation exchange beds, that is columns 1 and 2, if these materials are capable of substantially completely replacing cations of a neutral salt solution with hydrogen ions from the exchange material when operated in the conventional columnwise manner. General qualifications of the cation exchange materials usable in the exchange treatment columns 1 and 2 are that they must be cation exchange materials which are granular, insoluble in the solution being treated in this process, and capable of operating in the hydrogen cycle. The qualification regarding the hydrogen cycle is equivalent to the requirement that the material must be capable of existence in an acid form. A further qualification is that the acidic strength of the acid form of the material shall be sufficiently great so that exchangeable hydrogen will be available even though the solution passing through a bed of the material had a pH as low as any to be encountered in treating liquors or solutions according to the process of this invention.

Cation exchange materials now known to me to be well suited for the purpose of this invention, are classed as synthetic resins. However, this need not be an unavoidable qualification inasmuch as, for example, materials classed as sulphonated coal should also be workable or suitable in the process of this invention.

That is, the concept and principle of practicing this invention need not be limited by or dependent upon a specific chemical constitution or manner of production of the exchange material or materials used. In view of present day conditions and of a variety of exchange materials being commercially available, it is not necessary or vital that the exact composition of the exchange material be known to enable someone to operate the process of this invention. Indeed, an operator may select from various materials found in the patented art, or he may choose from among those now well known at least by their trade names and commercially available, which have the qualifications set forth above.

Indeed, in the practice of this invention according to the examples of operation give above the exact chemical constitution of the exchange materials such as Duolite A-2 and Duolite C-3 and Dowex 50 was not known to me in any material sense beyond the fact that they were classed as synthetic resinous exchange materials. Nothing was known as to the exact mode of their manufacture, although they represented suitable materials for the practice of this invention. The aforementioned qualifications of the exchange materials that render them suitable for use in this process are not unusual in so far as they correspond to general requirements which are to be met by exchange materials to be used for abstracting cations from a liquid in exchange for hydrogen ions yielded by the exchange material. As a general criterion, a cation exchange material in order to be workable for the purpose of this invention should be capable of substantially completely removing the cations from a solution in the hydrogen cycle. That is to say, my invention necessitated no specific new discovery in the way of developing a special exchange material since I found a choice of suitable exchange materials commercially available and suited for the purpose of this invention. Prima facie any one of these materials having the above stated qualifications appears to be acceptable for the purpose of practicing the process of this invention. Hence, this invention teaches that anyone wishing to operate this process on the principle or with the sequence of operating steps herein set forth, may do so without specialized knowledge of the exact composition or mode of manufacture of the exchange materials themselves that enter into the operation of this process. That is, he may obtain one of a number of exchange materials that are now commercially available under various names and prima facie suitable by the above criteria, and with them operate the process.

One qualification which is not necessarily met by every one of all cation exchange materials which are otherwise commercially useful is that the hydrogen form of the material shall be a relatively strong acid in order to meet the operating requirements of this invention. Again, however, as far as I am aware nearly all cation exchange materials now being commercially offered to operate in the hydrogen cycle are of sufficient acid strength for use in the process of this invention.

A criterion by which a cation exchange material of suitable acidic strength may be recognized and chosen from those commercially available may be gained as follows: A column of the exchange material or resin is rendered into the hydrogen form by thorough regeneration with a suitably strong mineral acid, for example HCl, the technique for regeneration being well known in the art. A solution of a neutral salt, for example NaCl, is then percolated slowly through the column of regenerated exchange material or resin. If the effluent from the column contains a portion or fraction from which substantially all the cations originally present in the salt solution have been removed and replaced by hydrogen ions so that the effluent portion contains acid corresponding to the anions originally present in the salt solution, then the material or resin may be considered as having sufficient acidic strength to be suitable for use in the process of this invention.

Having described the general qualifications of a suitable cation exchange material or resin, as well as the more special criterion of its acidic strength, there will now be discussed what appears to be the chemistry of the exchange material, although that discussion is not to be construed in any limiting sense with respect to the scope of this invention.

Cation exchange materials capable of operating in the hydrogen cycle seem usually to consist of organic structures of high molecular weight, containing substituent acidic groups which confer upon the material its exchange characteristics.

The organic structures must be rigid enough to permit shaping the exchange material into rigid grains, and may advantageously be of gel-like nature so that a solution can permeate the structure of the grains. In most currently commercially available exchange materials the organic structure is of the nature of a synthetic resin. More particularly, they are often of the type of phenol-formaldehyde condensation products, but may also consist of other types of polymers, for example polystyrene resins. However, the organic structure or "backbone" of the exchange material need not of necessity be synthetic, and therefore may comprise such substances as coal or natural lignins.

In various ways described in the patented art substituents are caused to occur in the structure of the exchange materials. Such exchange substituents commonly comprise sulfonic acid groups, carboxyl groups, and phenol groups, all three being characterized by acidic properties. Of these the sulfonic acid groups are apparently strongly acidic in character, the carboxyl groups weakly acidic, and the phenol groups very weakly acidic. Alternatively stated it could be said that the sulfonic acid groups readily yield up hydrogen ions, the carboxyl groups yield only a very small fraction of these ionizable hydrogens except to basic solutions, and the phenol groups are substantially not active in exchange reactions except under very basic conditions seldom encountered in practice.

While it thus appears that a cation exchanger should contain sulfonic acid substituents to be prima facie suited for use in the process of this invention, this is probably an over-simplified view of the matter, as the acidic strength of substituents depends to a large extent upon the nature of the molecule in which they are substituted. For example, the acidity conferred by the carboxyl group in trichloacetic acid is quite strong, and also that conferred in such acids as oxalic. It is in no way certain that carboxylic resins cannot be produced which will have sufficient acidity to meet the criteria whereby they are suitable for use in the process of this invention. On the other hand, some sulfonated cation exchange materials may not be strong enough to meet the criteria or requirements of this process.

The anion exchange materials

For the operation of the ion exchange column 3 in the separting step V and the removing step VI (see Figs. 7 and 8) I use a weakly basic anion exchange material in preference to one that is strongly basic, the reason being that a weakly basic anion exchange material or resin will selectively adsorb the acidic or glutamic acid and the P. C., while rejecting or refusing to adsorb the neutral amino acids and the betaine. As far as I am aware of the present state of the art, a more strongly basic anion exchange material may have some capacity for adsorbing neutral amino acids. However, with the present state of development of the exchange materials this question is somewhat academic inasmuch as truly strong, that is strongly basic, anion exchange materials do not yet exist as far as I am now aware. The strongest now available have but little capacity for neutral amino acids, and they would, therefore, perform a somewhat imperfect separation, although commercially feasible, if used in the process of this invention. That is to say, on the face of it almost any anion exchange material that I am at present aware of to be commercially available, would be suited for use in the process of this invention.

I claim:

1. The method of isolating glutamic compound contained in a sugar solution along with other amino compounds and with contaminating cations and anions naturally occurring in the solution, which comprising passing the solution through a first ion exchange station having a first bed of granular acid-regenerated cation exchange material to effect loading of the bed with a quantity of amino compounds including glutamic compound as well as with impurity cations, passing an unloading solution through the bed to effect unloading therefrom amino compounds including glutamic compound whereby an impure amino compound liquid is passed from the bed, heating the amino compound liquor to convert glutamic compound therein to pyrrolidone carboxylate whereby there results hydrolyzed amino compound liquor, purifying the hydrolyzed amino compound liquor by passing it through a second ion exchange station comprising a second bed of acid-regenerated cation exchange material whereby pyrrolidone carboxylate is rendered as pyrrolidone carboxylic acid in the resulting purified amino compound liquor flowing from said second bed while contaminating cations and $NH_3$ are retained by the bed, isolating pyrrolidone carboxylic acid from amino compounds by passing said purified amino compound liquor through a third ion exchange station comprising a bed of granular alkali-regenerated acid-adsorbing anion exchange material whereby pyrrolidone carboxylic acid is selectively retained by the bed, removing the pyrrolidone compound from said acid-adsorbing bed by passing therethrough a displacing solution whereby said acid is eluted from the bed and caused to pass therefrom in the resulting pyrrolidone compound liquor flowing from the bed, and treating the pyrrolidone compound liquor for rendering pyrrolidone compound therein into glutamic compound.

2. The method according to claim 1, in which the last-mentioned treatment step comprises subjecting the pyrrolidone compound liquor to boiling in the presence of excess NaOH to render pyrrolidone carboxylate salt as glutamate salt.

3. The method of isolating glutamic compound naturally occurring in a sugar solution along with other amino compounds as well as with inorganic cations and anions, which comprises treating the solution to separate therefrom interfering anions and sugar whereby there is produced an amino compound liquor containing glutamic compound and other amino compounds substantially free from sugar and interfering anions, heating the amino compound liquor to selectively convert glutamic compound therein to pyrrolidone carboxylate whereby there results hydroylzed amino compound liquor containing the pyrrolidone compund along with amino compounds and with contaminating cations, passing the hydroylzed compound liquor through a cation exchange station comprising a bed of acid-regenerated cation exchange material whereby the liquor is purified of contaminating cations being retained by the bed and the pyrrolidone carboxylate is rendered as pyrrolidone carboxylic acid, passing the thus purified hydroylzed amino compound liquor through an anion exchange station comprising a bed of granular alkali-regenerated acid-adsorbing anion exchange material whereby pyrrolidone carboxylic acid is selectively retained by the bed, passing through said bed of acid-absorbing ion exchange material a displacing solution whereby pyrrolidone carboxylic acid is eluted from the bed and treating the resulting effluent solution from the bed, for rendering pyrrolidone compound therein into glutamic compound.

4. The method of isolating glutamic compound naturally occurring in a sugar solution along with other amino compounds as well as with inorganic cations and anions, which comprises treating the sugar solution to separate therefrom interfering anions and sugar whereby there is produced an amino compound liquor containing glutamic compound and other amino compounds substantially free from sugar and interfering anions, treating the amino compound liquor to selectively convert glutamic compound therein to pyrrolidone compound whereby there results a mixed liquor containing the pyrrolidone compound along with amono compounds and with contaminating cations, passing the mixed liquor through a cation exchange station comprising a bed of acid-regenerated cation exchange material whereby the liquor is purified of contaminating cations being retained by the bed and the pyrrolidone carboxylate is rendered as pyrrolidone carboxylic acid, passing the thus purified mixed liquor through an anion exchange station comprising a bed of granular alkali-regenerated acid-adsorbing anion exchange material whereby pyrrolidone carboxylic acid is selectively retained by the bed, passing through said bed of acid-adsorbing exchange material a displacing solution whereby pyrrolidone carboxylic acid is eluted from the bed, and treating the resulting effluent solution from the bed for rendering pyrrolidone compound therein into glutamic compound.

5. The method of deriving pyrrolidone compound from a sugar solution containing glutamic compound along with other amino compounds and with inorganic ionized impurity solutes, which comprises passing the solution through a first ion exchange station having a first bed of granular acid regenerated cation exchange material to effect loading thereof with a quantity of the amino compounds as well as of impurity cations, unloading the amino compounds including glutamic compound from the bed by passing therethrough an unloading solution whereby an impure amino compound liquor is passed from the bed, subjecting the amino compound liquor to heating to selectively convert glutamic compound to pyrrolidone compound namely pyrrolidone carboxylate whereby there results hydrolyzed amino compound liquor, purifying the hydrolyzed amino compound liquor by passing it through a second ion exchange station comprising a second bed of acid-regenerated cation exchange material whereby pyrrolidone carboxylate is rendered as pyrrolidone carboxylic acid obtained in the resulting purified hydrolyzed amino compound liquor while contaminating cations and NH$_3$ are retained by the bed, passing the purified hydrolyzed amino compound liquor through an anion exchange station comprising a bed of granular alkali-regenerated acid-adsorbing anion exchange material whereby pyrrolidone carboxylic acid is selectively retained by the bed, and passing through said bed of acid-adsorbing anion exchange material a displacing solution whereby pyrrolidone compound is eluted from the bed.

6. The method of deriving pyrrolidone compound from a sugar solution having glutamic compound and other amino compounds along with inorganic cations and anions naturally occurring therein which comprises treating the solution to separate therefrom amino compound liquor containing glutamic compound and other amino compounds in solution substantially free from sugar as well as from interfering anions, heating the amino compound liquor to selectively convert the glutamic compound thereof to pyrrolidone carboxylate whereby there results hydrolyzed amino compound liquor, passing the hydrolyzed amino compound liquor through a cation exchange station comprising a bed of acid-regenerated cation exchange material whereby the liquor is purified of contaminating cations being retained by the bed and the pyrrolidone carboxylate is rendered as pyrrolidone carboxylic acid, and passing the thus purified hydrolyzed amino compound liquor through an anion exchange station comprising a bed of granular alkali-regenerated acid-adsorbing anion exchange material whereby pyrrolidone carboxylic acid is selectively retained by the bed.

7. The method of deriving pyrrolidone compound from a sugar solution having glutamic compound and other amino compounds along with inorganic cations and anions naturally occurring therein, which comprises treating the solution to separate therefrom amino compound liquor containing glutamic compound and other amino compounds in solution substantially free from sugar as well as from interfering anions, treating the amino compound liquor to selectively convert glutamic compound therein to pyrrolidone carboxylate whereby there results a mixed liquor containing pyrrolidone compound along with amino compound and contaminating cations, passing the mixed liquor through a cation exchange station comprising a bed of acid-regenerated cation exchange material whereby the liquor is purified of contaminating cations being retained by the bed and the pyrrolidone carboxylate is rendered as pyrrolidone carboxylic acid, and passing the thus purified mixed liquor through an anion exchange station comprising a bed of granular alkali-regenerated acid-adsorbing anion exchange material whereby pyrrolidone carboxylic acid is selectively retained by the bed.

8. The method of deriving pyrrolidone compound from a sugar solution having glutamic compound and other amino compounds along with inorganic cations and anions naturally occurring therein, which comprises passing the solution through a bed of acid-regenerated cation exchange material to effect loading of the bed with a quantity of amino compounds including glutamic compound as well as with impurity cations, passing an unloading solution through the bed to pass therefrom amino compound liquor containing glutamic compound and other amino compounds in solution substantially free from sugar as well as from interfering anions, treating the amino compound liquor to selectively convert glutamic compound therein to pyrrolidone compound whereby there results a mixed liquor containing pyrrolidone compound along with amino compounds and contaminating cations, and separating the pyrrolidone compound from the amino compounds by passing the mixed liquor through the bed of ion exchange material which is of the kind that is discriminative as between an anionic group of compounds and a cationic group of compounds as represented by the pyrrolidone compound and the amino compounds respectively whereby one of said groups is adsorbed by said material while the other group is rejected and passes in the effluent solution from the bed.

ELLIOTT B. FITCH.

REFERENCES CITED

The following references are of record in the file of this patent:

UNITED STATES PATENTS

| Number | Name | Date |
|---|---|---|
| 2,375,164 | Bennett | May 1, 1945 |

OTHER REFERENCES

Ser. No. 359,575, Smit (A. P. C.), published May 11, 1943.

Beilstein, 4th edition, 2nd supplement to vol. IV, pages 902 and 907 (1942).

Englis and Fiess, Ind. and Eng. Chem., July 1944, vol. 36, pages 604–609.